(12) United States Patent
Bohres

(10) Patent No.: US 11,203,711 B2
(45) Date of Patent: Dec. 21, 2021

(54) AQUEOUS COMPOSITIONS FROM PARAFFIN INHIBITORS

(71) Applicant: BASF SE, Ludwigshafen am Rhein (DE)

(72) Inventor: Edward Bohres, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 256 days.

(21) Appl. No.: 16/467,143

(22) PCT Filed: Nov. 24, 2017

(86) PCT No.: PCT/EP2017/080302
§ 371 (c)(1),
(2) Date: Jun. 6, 2019

(87) PCT Pub. No.: WO2018/104071
PCT Pub. Date: Jun. 14, 2018

(65) Prior Publication Data
US 2020/0308471 A1    Oct. 1, 2020

(30) Foreign Application Priority Data

Dec. 7, 2016 (EP) .................................. 16202577

(51) Int. Cl.
*C09K 8/524* (2006.01)
*C09K 8/86* (2006.01)

(52) U.S. Cl.
CPC ............. *C09K 8/524* (2013.01); *C09K 8/86* (2013.01)

(58) Field of Classification Search
None
See application file for complete search history.

(56) References Cited

U.S. PATENT DOCUMENTS

| | | | |
|---|---|---|---|
| 7,842,650 B2 | 11/2010 | Steinbrenner | |
| 2010/0130385 A1 | 5/2010 | Guzmann et al. | |
| 2014/0209304 A1* | 7/2014 | Reed | E21B 43/162 166/268 |
| 2016/0032170 A1* | 2/2016 | Li | C09K 8/588 166/305.1 |
| 2017/0292657 A1* | 10/2017 | Kundu | F17D 3/12 |
| 2018/0355266 A1 | 12/2018 | Castro et al. | |
| 2019/0024011 A1 | 1/2019 | Braeuer et al. | |

FOREIGN PATENT DOCUMENTS

| | | |
|---|---|---|
| CA | 2889070 A1 | 6/2014 |
| CA | 2889773 A1 | 6/2014 |
| DE | 2612757 A1 | 9/1977 |
| EP | 0214786 A1 | 3/1987 |
| EP | 1746147 A1 | 1/2007 |
| GB | 1468588 A | 3/1977 |
| WO | WO-9851731 A1 | 11/1998 |
| WO | WO-2008012242 A1 | 1/2008 |
| WO | WO-2008125588 A1 | 10/2008 |
| WO | WO-2014095408 A1 | 6/2014 |
| WO | WO-2014095412 A1 | 6/2014 |
| WO | WO-2015124529 A1 | 8/2015 |
| WO | WO-2018054892 A1 | 3/2018 |

OTHER PUBLICATIONS

International Search Report for PCT/EP2017/080302 dated Jan. 22, 2018.
Written Opinion of the International Searching Authority for PCT/EP2017/080302 dated Jan. 22, 2018.
U.S. Appl. No. 16/311,015, filed Dec. 18, 2018.
European Search Report for EP Application No. 16202577.9, dated Jun. 29, 2017.

* cited by examiner

*Primary Examiner* — John J Figueroa

(74) *Attorney, Agent, or Firm* — Faegre Drinker Biddle & Reath LLP

(57) ABSTRACT

An aqueous composition comprising at least a continuous aqueous phase and particles of a paraffin inhibitor component distributed therein, which is stabilized by a combination of at least 3 surfactants. Processes for producing compositions of this kind, and the use of compositions of this kind as a pour point depressant and wax inhibitor.

25 Claims, No Drawings

AQUEOUS COMPOSITIONS FROM PARAFFIN INHIBITORS

CROSS-REFERENCE TO RELATED APPLICATIONS

This application is a national stage application (under 35 U.S.C. § 371) of PCT/EP2017/080302, filed Nov. 24, 2017, which claims benefit of European Application No. 16202577.9, filed Dec. 7, 2016, both of which are incorporated herein by reference in their entirety.

The present invention relates to an aqueous composition comprising at least a continuous aqueous phase and particles of a paraffin inhibitor component distributed therein, which is stabilized by a combination of at least 3 surfactants. It further relates to a process for producing compositions of this kind, and to the use of compositions of this kind as a pour point depressant and wax inhibitor.

The deposit temperature of oil deposits is generally above the ambient temperature at ground level. Accordingly, produced crude oils are generally at elevated temperature and, after being produced, naturally cool down more or less quickly to the ambient temperature.

According to their origin, crude oils comprise different proportions of what are called waxes, which consist essentially of long-chain n-paraffins. According to the type of crude oil, the proportion of such paraffins may typically be 1% to 30% by weight of the crude oil. The paraffins can crystallize and precipitate out in the form of platelets in the course of cooling of the crude oil after production. The lowest temperature at which a sample of an oil still just flows in the course of cooling is referred to as the pour point ("yield point"). For the measurement of the pour point, standardized test methods are used. Wax-rich types of mineral oil can have a pour point up to about 50° C.

Crystallized paraffins considerably impair the flowability of the oil. Precipitated paraffins can block filters, pumps, pipelines and other installations or be deposited in tanks, thus entailing a high level of cleaning.

It is known that the pour point of crude oils can be lowered by suitable additives. This can prevent paraffins from precipitating and being able to form deposits in the course of cooling of produced crude oil. Additives of this kind are referred to, for example, as pour point depressants, paraffin inhibitors, wax inhibitors or flow improvers. These are generally polymers.

Examples of polymers for use as paraffin inhibitors or pour point depressants include copolymers of ethylene, vinyl esters and alkyl (meth)acrylates or graft copolymers obtainable by polymerization of alkyl (meth)acrylates in the presence of ethylene-vinyl ester copolymers, as described, for example, by WO 2014/095412 A1, WO 2014/095408 A1 or WO 2015/124529 A1. Further examples include copolymers of long-chain olefins and maleic anhydride, where the copolymerized maleic anhydride units are reacted in a second step with long-chain alcohols, for example behenyl alcohol, as disclosed, for example, by GB 1 468 588, EP 214 786 A1 and EP 1 746 147 A1.

Additives of this kind for use as paraffin inhibitors or pour point depressants are frequently wax-like, solid products. They therefore have to be melted and suitably formulated for use. This means additional apparatus and/or personnel demands for the user, who would like to avoid these. This is especially important when there is a shortage of space, as, for example, on a mineral oil platform. Users are therefore frequently demanding ready-to-use formulations.

Ready-to-use formulations may, for example, be solutions of pour point depressants in organic solvents, especially hydrocarbons.

Ready-to-use formulations may also be aqueous compositions in which solid particles of paraffin inhibitors are distributed in aqueous compositions. Such compositions of pour point depressants or paraffin inhibitors are known, for example from DE 26 12 757 A1, WO 98/51731 A1 or WO 2008/125588 A1. Aqueous compositions are very popular with users because working with organic solvents is avoided.

A number of demands are placed on aqueous compositions of pour point depressants. They should firstly have a maximum content of pour point depressant in order to save transport costs and storage costs. This is especially important when there is a shortage of storage space, as, for example, on a mineral oil platform. But the higher the concentration, the more quickly the aqueous compositions will solidify. In addition, the compositions are to be stable in spite of a relatively high concentration. Finally, suitable compositions must also still be free-flowing at temperatures below the freezing point. This is important when they are to be used in a cold environment, for example in Arctic regions.

It was therefore an object of the invention to provide improved aqueous compositions of pour point depressants for use at low temperatures. More particularly, the formulations were to be aqueous formulations that are also still fluid at temperatures of less than 0° C., for example in the range from more than −20° C. to 0° C.

Accordingly, aqueous compositions comprising at least
(1) a continuous aqueous phase comprising water and a water-miscible organic solvent,
(2) particles of a paraffin inhibitor component having a melting point of 30° C. to 95° C. that are distributed therein, and
(3) surfactants,
have been found, and wherein
the aqueous phase has a melting point of not more than −20° C.,
the paraffin inhibitor component is a mixture comprising at least
an organic, water-immiscible solvent, and
a polymeric, water-insoluble paraffin inhibitor (X) comprising, as monomers,
α-olefins having 14 to 32 carbon atoms, and
monoethylenically unsaturated monomers comprising carboxylate groups, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms,
the amount of the paraffin inhibitor component is 20% to 40% by weight, based on the sum total of all the components of the composition,
the surfactants are at least three different surfactants (A), (B) and (C) which are defined as follows:
(A) at least one nonionic surfactant of the general formula $R^1\text{-}(AO)_xH$ where
$R^1$ is a linear alkyl radical having 8 to 20 carbon atoms,
AO are independently $C_2$- to $C_4$-alkylene oxide units, with the proviso that at least 80 mol % of the AO units are ethylene oxide units (EO), and
x is a number from 5 to 20,
(B) at least one surfactant selected from the group of
(B1) nonionic surfactants of the general formula $R^2\text{-}(AO)_yH$ where R$^1$ is a branched alkyl radical having 8 to 20 carbon atoms, AO are independently C$_2$- to C$_4$-alkylene oxide units, with the proviso that at least 80 mol % of the AO units are ethylene oxide units (EO), and y is a number from 5 to 20, (B2) nonionic surfactants of the general formula R$^3$—CH$_2$—N[(AO)$_x$H]$_2$ where R$^3$ is a linear alkyl radical or alkenyl radical having 8 to 20 carbon atoms, AO are independently C$_2$- to C$_4$-alkylene oxide units, with the proviso that at least 80 mol % of the AO units are ethylene oxide units (EO), and z is a number from 3 to 10, (C) at least one nonionic surfactant of the general formula R$^4$-(AO) H where R$^4$ is a linear alkyl radical having 8 to 20 carbon atoms, AO are independently C$_2$- to C$_4$-alkylene oxide units, with the proviso that at least 80 mol % of the AO units are ethylene oxide units (EO), and m is a number from more than 20 to 70, and where the amount of the surfactants (A) is 5% to 15% by weight, that of the surfactants (B) from 5% to 15% by weight, and that of the surfactants (C) from 2% to 5% by weight, based in each case on the paraffin inhibitor component.

In a further embodiment of the invention, aqueous compositions comprising at least (1) a continuous aqueous phase, (2) particles of a paraffin inhibitor component that are distributed therein, and (3) surfactants, have been found, wherein the continuous aqueous phase comprises water and 1,2-propylene glycol and/or ethylene glycol, where the proportion of 1,2-propylene glycol and/or ethylene glycol is 40% to 60% by weight based on the sum total of all components of the aqueous phase, and the rest is water, the paraffin inhibitor component is a mixture comprising at least 10% to 40% by weight of a hydrocarbon or a hydrocarbon mixture having a boiling point of at least 120° C., and 60% to 90% by weight of at least one polymeric, water-insoluble paraffin inhibitor (X) comprising, as monomers, α-olefins having 14 to 32 carbon atoms, and monoethylenically unsaturated monomers comprising carboxylate groups, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms, where the figures of amount are based on the sum total of all components of the paraffin inhibitor component and the sum total of paraffin inhibitors (X) and hydrocarbons is 100% by weight, the amount of the paraffin inhibitor component is 20% to 40% by weight, based on the sum total of all the components of the aqueous composition, the surfactants are at least three different surfactants (A), (B) and (C) which are defined as follows:

(A) at least one nonionic surfactant of the general formula R$^1$-(AO)$_x$H where R$^1$ is a linear alkyl radical having 8 to 20 carbon atoms, AO are independently C$_2$- to C$_4$-alkylene oxide units, with the proviso that at least 80 mol % of the AO units are ethylene oxide units (EO), and x is a number from 5 to 20, (B) at least one surfactant selected from the group of (B1) nonionic surfactants of the general formula R$^2$-(AO)$_y$H where R$^1$ is a branched alkyl radical having 8 to 20 carbon atoms, AO are independently C$_2$- to C$_4$-alkylene oxide units, with the proviso that at least 80 mol % of the AO units are ethylene oxide units (EO), and y is a number from 5 to 20, (B2) nonionic surfactants of the general formula R$^3$—CH$_2$—N[-(AO)$_z$H]$_2$ where R$^3$ is a linear alkyl radical or alkenyl radical having 8 to 20 carbon atoms, AO are independently C$_2$- to C$_4$-alkylene oxide units, with the proviso that at least 80 mol % of the AO units are ethylene oxide units (EO), and z is a number from 3 to 10, (C) at least one nonionic surfactant of the general formula R$^4$-(AO)$_m$H where R$^4$ is a linear alkyl radical having 8 to 20 carbon atoms, AO are independently C$_2$- to C$_4$-alkylene oxide units, with the proviso that at least 80 mol % of the AO units are ethylene oxide units (EO), and m is a number from more than 20 to 70, and where the amount of the surfactants (A) is 5% to 15% by weight, that of the surfactants (B) from 5% to 15% by weight, and that of the surfactants (C) from 2% to 5% by weight, based in each case on the paraffin inhibitor component.

In addition, a process for producing compositions of this kind has been found, in which a melt of the desired paraffin inhibitor component is dispersed in the aqueous phase, with addition of the surfactants (A), (B) and (C), at a temperature above the melting temperature of the paraffin inhibitor component using a suitable dispersing unit, and then the mixture is allowed to cool down to a temperature below the melting temperature of the paraffin inhibitor component.

Finally, the use of compositions of this kind as a pour point depressant and wax inhibitor has been found.

Specific details of the invention are as follows:

In the aqueous composition of the invention, particles of a paraffin inhibitor component, especially having a melting point of 30° C. to 90° C., are distributed in a continuous aqueous phase at least comprising water and a water-miscible organic solvent, wherein the composition is stabilized by surfactants.

Aqueous Phase

The aqueous phase comprises water and water-miscible organic solvent. According to the invention, the aqueous phase has a melting point of not more than −20° C., preferably not more than −25° C., more preferably not more than −30° C. The melting point may, for example, be in the range from −60° C. to −20° C., especially −50° C. to −25° C.

Examples of water-miscible organic solvents especially include alcohols such as methanol, ethanol, n-propanol, i-propanol, ethylene glycol, diethylene glycol, 1,2-propylene glycol, 1,3-propylene glycol, ethylene glycol monomethyl ether or propylene glycol monomethyl ether. Examples of preferred organic solvents include ethylene glycol, diethylene glycol, 1,2-propylene glycol, 1,3-propylene glycol, ethylene glycol monomethyl ether or propylene glycol monomethyl ether ethylene.

The respective amounts of water and organic solvent are determined by the person skilled in the art according to the desired melting point of the mixture. Suitable mixing ratios can be taken from relevant tabular works or one can determine them oneself by a few experiments. The amount of organic solvents is generally at least 20% by weight, for example 20% by weight to 80% by weight, especially 30% by weight to 70% by weight, based on the total amount of all solvents in the aqueous phase.

In one embodiment of the invention, an aqueous phase comprising water and 1,2-propylene glycol and/or ethylene glycol is used, where the proportion of 1,2-propylene glycol and/or ethylene glycol is 40% to 60% by weight, and the remainder of the aqueous phase is water.

Paraffin Inhibitor Component

According to the invention, the aqueous composition further comprises particles of at least one paraffin inhibitor component having a melting point of 30° C. to 95° C., preferably 40° C. to 80° C. and, for example, 45° C. to 65° C., that are distributed in the aqueous phase.

The paraffin inhibitor component is a mixture comprising at least one polymeric paraffin inhibitor (X) and an organic, water-immiscible solvent. The particles may of course also be particles comprising different polymeric paraffin inhibitors (X) and/or mixtures of different particles each comprising different polymeric paraffin inhibitors (X).

The particles are spherical or virtually spherical particles. The average particle size may, for example, be 1 to 10 μm, especially 1 to 6 μm, for example 2 to 4 μm. In the case of spherical particles, this figure relates of course to the diameter; in the case of nonspherical particles, this parameter relates to the longest semiaxis.

The term "paraffin inhibitor" in the context of the present invention refers to substances having the property of preventing or at least reducing the separation of paraffins out of crude oil and/or of reducing the pour point of crude oils.

Without wishing to be tied to a particular theory, this behavior can be explained by the fact that paraffins crystallize, typically in the form of platelets, in the course of cooling of crude oil when the temperature goes below a particular level. The n-paraffin crystals in platelet form can form a kind of house-of-cards structure which encloses the crude oil, such that the crude oil ceases to flow, even though the predominant portion is still fluid. Paraffin inhibitors firstly prevent the formation of these house-of-cards-like structures and thus lower the temperature at which the crude oil solidifies. In addition, paraffin inhibitors can promote the formation of very fine, well-crystallized, non-agglomerating paraffin crystals, such that undisrupted oil transport is ensured.

Paraffin inhibitors are lipophilic by nature and are accordingly water-insoluble or at least barely water-soluble.

Paraffin Inhibitors (X)

The polymeric paraffin inhibitor (X) is a copolymer comprising, as monomers,

α-olefins having 14 to 32, preferably 16 to 26, carbon atoms, and monoethylenically unsaturated monomers comprising carboxylate groups, where some or all of the carboxylate groups have been esterified with aliphatic, cycloaliphatic and/or aromatic alcohols, with the proviso that at least 50 mol % of the alcohols are linear aliphatic alcohols having 16 to 32, preferably 16 to 26, carbon atoms.

The monomers having carboxylate groups may, for example, be acrylic acid, methacrylic acid, maleic acid, fumaric acid or itaconic acid, or salts thereof. Preference is given to maleic acid.

Copolymers comprising maleic acid units of this kind are obtainable by reacting copolymers of α-olefins and maleic anhydride, followed by polymer-analogous reaction of the maleic anhydride units with alcohols. Preference is given here to using not more than 1 equivalent of alcohol per maleic anhydride unit, such that the esters are essentially monoalkyl maleates. Suitable copolymers of α-olefins and maleic anhydride comprise especially 40 to 60 mol %, preferably 45 mol % to 55 mol %, of α-olefins and 60 mol % to 40 mol %, preferably 55 mol % to 45 mol %, of maleic anhydride.

In a preferred embodiment of the invention, the polymeric paraffin inhibitor (X) is a copolymer comprising, as monomers, 40 to 60 mol % of α-olefins having 14 to 32, preferably 16 to 26, carbon atoms, and 60 to 40 mol % of maleic acid or salts thereof, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms.

Preferably 30% to 60%, especially 40% to 50%, of the carboxylate groups have been esterified, meaning that the maleic acid-based units are essentially monoalkyl maleates. In addition, a small amount of dialkyl maleates, unconverted maleic anhydride units and possibly maleic acid or salts thereof may be present.

The linear aliphatic alcohols having 16 to 32 carbon atoms, preferably 16 to 26 carbon atoms, may of course be mixtures of different alcohols. These may especially be mixtures of naturally occurring fatty alcohols or wax alcohols. Fatty alcohols or wax alcohols from natural sources typically have an even number of carbon atoms. In one embodiment of the invention, a mixture of at least three alcohols is used, comprising at least 1-docosyl alcohol, 1-tetracosylalkohol and 1-hexacosyl alcohol.

In one embodiment, the alcohols used for esterification are exclusively linear aliphatic alcohols having 16 to 32, preferably 16 to 26, carbon atoms.

In a further embodiment of the invention, esterification is accomplished using a mixture comprising 50 to 90 mol % of linear aliphatic alcohols having 16 to 32 carbon atoms and 10 mol % to 50 mol % of different linear, branched or cyclic aliphatic alcohols or aromatic alcohols. Additional alcohols of this kind may especially be linear aliphatic alcohols having 4 to 10 carbon atoms, branched and/or secondary aliphatic alcohols having 4 to 32 carbon atoms, unsubstituted or alkyl-substituted, cyclic aliphatic alcohols having 5 to 18 carbon atoms or unsubstituted or alkyl-substituted aromatic alcohols having 6 to 36 carbon atoms.

The weight-average molecular weight $M_w$ of the preferred paraffin inhibitors is generally 2000 g/mol to 25 000 g/mol.

Paraffin Inhibitor Components Comprising Organic Solvents

The polymeric paraffin inhibitors (X) are used in a mixture with organic, water-immiscible solvents.

This approach has several advantages: firstly, the polymeric paraffin inhibitors can advantageously be prepared in solvents of this kind, and it is advantageous not to have to remove the solvents. The dissolution of the paraffin inhibitor component in the crude oil is also made easier when the polymeric paraffin inhibitor (X) is already in a mixture with an organic solvent. Finally, the desired melting point of the paraffin inhibitor component can be adjusted in a simple manner via the nature of the organic solvent and the mixing ratio of organic solvent and polymeric paraffin inhibitor (X). It is of course also possible to use mixtures of different organic solvents.

Examples of preferred organic solvents include hydrocarbons or hydrocarbon mixtures, especially those having a boiling point of more than 120° C., preferably more than 150° C. Preference is given to using organic solvents having a flashpoint of ≥60° C.

These may be aliphatic, cycloaliphatic and/or aromatic hydrocarbons or hydrocarbon mixtures.

In one embodiment, the solvents are saturated aliphatic solvents or solvent mixtures. These may be either paraffinic or naphthenic, i.e. saturated cyclic, hydrocarbons. Preference is given to high-boiling aliphatic hydrocarbons having a boiling point of at least 175° C. and preferably a flashpoint of ≥60° C. It is especially possible to use technical grade mixtures of hydrocarbons, for example mixtures of paraffinic hydrocarbons, mixtures of paraffinic and naphthenic hydrocarbons or mixtures of isoparaffins. It will be apparent to those skilled in the art that technical grade mixtures may still comprise small residues of aromatic or unsaturated hydrocarbons. The content of aromatic and/or unsaturated hydrocarbons should, however, be generally <1% by weight, preferably <0.5% by weight and more preferably <0.1% by weight. Technical grade mixtures of saturated aliphatic solvents are commercially available, for example technical grade mixtures of the Shellsol® D series or the Exxsol® D series.

In a further embodiment, the solvents may be aromatic solvents or solvent mixtures. Preference is given to high-boiling aromatic hydrocarbons having a boiling point of at least 175° C. and preferably a flashpoint of 60° C. It is especially possible to use technical grade mixtures of aromatic hydrocarbons. Technical grade mixtures of aromatic solvents are commercially available, for example technical grade mixtures of the Shellsol® A series or the Solvesso® series.

The paraffin inhibitor components may of course, as well as the polymeric paraffin inhibitors (X) and optionally organic, water-immiscible solvents, also comprise further constituents.

The mixing ratio of paraffin inhibitor component (X) and organic solvent can be adjusted by the person skilled in the art according to the desired properties, especially according to the desired melting point. In general, however, the proportion of the polymeric paraffin inhibitors (X) is at least 50% by weight based on the sum total of all components of the paraffin inhibitor component, especially 50% by weight to 90% by weight. Preferred paraffin inhibitor components comprise 60% by weight to 90% by weight of polymeric paraffin inhibitors (X) and 10% by weight to 40% by weight of organic solvents.

According to the invention, the amount of the paraffin inhibitor component (X) is 20% to 40% by weight, based on the sum total of all the components of the aqueous composition, preferably 25% by weight to 35% by weight.

Surfactants

According to the invention, the aqueous composition comprises at least 3 different surfactants (A), (B) and (C). The surfactants stabilize the aqueous composition.

The surfactants (A) and (B) are preferably surfactants having an aliphatic hydrocarbyl radical having 8 to 20 carbon atoms, where the surfactants (A) have a linear aliphatic hydrocarbyl radical and the surfactants (B) have a branched aliphatic hydrocarbyl radical. The surfactants may be nonionic or ionic, preferably nonionic surfactants.

The surfactant (C) is preferably a polymeric surfactant, preferably a nonionic polymeric surfactant having a number-average molecular weight $M_n$ of at least 750 g/mol, for example 750 to 7500 g/mol, especially 750 to 4000 g/mol.

Surfactants (A)

The surfactants (A) are at least one nonionic surfactant of the general formula (I) $R^1$-(AO)$_x$H.

$R^1$ is a linear alkyl radical having 8 to 20 carbon atoms, preferably 12 to 20 carbon atoms and, for example, 14 to 18 carbon atoms. It may, for example, be $C_{16}$- and $C_{18}$-alkyl radicals.

The AO groups are independently $C_2$- to $C_4$-alkylene oxide units, for example 1,2-ethyleneoxy —CH$_2$CH$_2$O—, 1,2-propyleneoxy —CH$_2$CH(CH$_3$)O— and 1,2-butyleneoxy groups —CH$_2$CH(C$_2$H$_5$)O—, with the proviso that at least 80 mol %, preferably at least 90 mol %, of the AO units are ethyleneoxy units (EO). In a preferred embodiment, the units are exclusively ethyleneoxy units (EO).

In formula (I), x is a number from 5 to 20, preferably 8 to 15. It will be apparent to the person skilled in the art in the field of alkoxylations that these are average values.

Preferably, the surfactant (A) is at least one nonionic surfactant of the general formula $R^1$-(EO)$_x$H where $R^1$ is a linear alkyl radical having 12 to 20 carbon atoms and x is a number from 8 to 15.

Surfactants (B)

The surfactants (B) are at least one surfactant selected from the group of the surfactants (B1) and (B2).

Surfactants (B1)

(B1) comprises nonionic surfactants of the general formula (II) $R^2$-(AO)$_y$H.

$R^2$ is a branched alkyl radical having 8 to 20 carbon atoms, preferably 11 to 17 carbon atoms. The AO groups have the definition given above, with the proviso that at least 80 mol %, preferably at least 90 mol %, of the AO units are ethyleneoxy units (EO). In a preferred embodiment, the units are exclusively ethyleneoxy units (EO).

In formula (II), y is a number from 5 to 20, preferably 5 to 15. It will be apparent to the person skilled in the art in the field of alkoxylations that these are average values.

Preferably, the surfactant (B1) is at least one nonionic surfactant of the general formula $R^2$-(EO)$_y$H where $R^2$ is a branched alkyl radical having 11 to 17 carbon atoms and y is a number from 5 to 15.

Surfactants (B2)

(B2) comprises nonionic surfactants of the general formula (III) $R^3$—CH$_2$—N[-(AO)]$_2$.

$R^3$ is a linear alkyl radical or linear alkenyl radical having 8 to 20 carbon atoms, preferably 12 to 20 carbon atoms. It is preferably an alkenyl radical.

The AO groups have the definition given above, with the proviso that at least 80 mol %, preferably at least 90 mol %, of the AO units are ethyleneoxy units (EO). In a preferred embodiment, the units are exclusively ethyleneoxy units (EO).

In formula (III), z is a number from 3 to 10, preferably 4 to 8. It will be apparent to the person skilled in the art in the field of alkoxylations that these are average values.

Preferably, the surfactant (B2) is at least one nonionic surfactant of the general formula $R^3$—CH$_2$—N[-(EO)$_z$H]$_2$ where $R^3$ is a linear alkenyl radical having 12 to 20 carbon atoms and z is a number from 4 to 8.

Surfactants (C)

The surfactants (C) are at least one nonionic surfactant of the general formula (IV) $R^4$-(AO)$_m$H.

$R^4$ is a linear alkyl radical having 8 to 20 carbon atoms, preferably 12 to 20 carbon atoms and, for example, 14 to 18 carbon atoms. It may, for example, be $C_{16}$- and $C_{18}$-alkyl radicals.

The AO groups have the definition given above, with the proviso that at least 80 mol %, preferably at least 90 mol %, of the AO units are ethyleneoxy units (EO). In a preferred embodiment, the units are exclusively ethyleneoxy units (EO).

In formula (IV), m is a number from 20 to 70, preferably 40 to 60. It will be apparent to the person skilled in the art in the field of alkoxylations that these are average values.

Preferably, the surfactant (C) is at least one nonionic surfactant of the general formula $R^4$-$(EO)_m$H where $R^4$ is a linear alkyl radical having 12 to 20 carbon atoms and m is a number from 40 to 60.

Amount of the Surfactants

The amount of the surfactants (A) is 5% to 15% by weight, that of the surfactants (B) from 5% to 15% by weight, and that of the surfactants (C) from 2% to 5% by weight, based in each case on the paraffin inhibitor component. Preferably, the amount of the surfactants is such that the total amount of the surfactants is 15% to 25% by weight.

Preferred Aqueous Composition

In one embodiment of the invention, the composition is the following aqueous composition:

| | |
|---|---|
| Paraffin inhibitor component (X) | 10% to 40% by weight |
| Surfactant (A) | 1% to 3% by weight |
| Surfactant (B) | 1% to 3% by weight |
| Surfactant (C) | 0.1% to 2% by weight |
| KOH (85%) | 0% to 1% by weight |
| Water | 15% to 40% by weight |
| Propylene glycol | 25% to 50% by weight |

Process for Producing the Aqueous Compositions

The compositions of the invention can be prepared by melting the desired paraffin inhibitor component(s), distributing them in the aqueous phase, with addition of the surfactants (A), (B) and (C), at a temperature above the melting temperature of the paraffin inhibitor component, and then allowing the mixture to cool back down to room temperature. In the course of cooling, the paraffin inhibitor component solidifies again, leaving solid particles of the paraffin inhibitor component dispersed in the aqueous phase.

For distribution of the molten paraffin inhibitor component in the aqueous phase, it is possible to use stirring and/or dispersing units that are known in principle, for example stirrers, propeller stirrers, colloid mills, Ultraturrax systems, ultrasound generators, homogenizers or combinations thereof.

Ultraturrax systems function on the basis of the rotor-stator principle. The rotor is moved here with a high circumferential velocity. This rotation brings about suction, which sucks the medium into the rotor and pushes it outward through the teeth of the stator. This disperses the sample.

Homogenizers serve primarily for reduction and standardization of the particle size of an existing emulsion. For this purpose, a coarse emulsion is forced through the gap of a homogenizing valve or a plurality thereof. The gap between the valve seat and valve body is adjustable and is generally only a few micrometers. The fluid flows radially through the gap, with a considerable rise in the flow rate. After leaving the gap, the fluid generally hits an impact ring. The pressure is generally generated by a piston pump, especially by a piston pump having multiple pistons, for example having 3 pistons.

For execution of the process, various procedures are conceivable in principle. For example, the paraffin inhibitor component and the surfactants can be heated and the aqueous phase can be added to the heated mixture. A portion of the aqueous phase can also already be added prior to heating. It is also possible first to heat the aqueous phase and then to add the paraffin inhibitor component.

The minimum temperature to which heating is necessary is inevitably guided by the melting point of the paraffin inhibitor component. The temperature must at least reach the melting point of the paraffin inhibitor component. Appropriately, the temperature to which heating is effected is at least 5° C. higher, preferably at least 10° C. higher, than the melting temperature of the paraffin inhibitor component. If preferred paraffin inhibitor components having a melting point of 45° C. to 65° C. are used, a temperature of 70° C. to 90° C. has been found to be useful.

In one embodiment of the invention, the aqueous composition is produced by means of a multistage process. In this case, in a first stage, a solid paraffin inhibitor component, surfactants (A), (B) and (C) and at least a portion of the aqueous phase are mixed with one another at a temperature below the melting temperature of the paraffin inhibitor component, and then they are heated to a temperature above the melting temperature with continued mixing. This forms droplets of the paraffin inhibitor component in the aqueous phase. The mixing in the first stage can especially be effected by means of stirring, for example by stirring with a propeller stirrer.

Subsequently, the mixture is homogenized using a suitable dispersing unit. The dispersing units divide the molten droplets of the paraffin inhibitor component which are stabilized by the surfactants. For this purpose, for example, it is possible to use an Ultraturrax system and/or a homogenizer. In one embodiment of the invention, a homogenizer is used for the second stage.

Subsequently, the mixture, as described above, is allowed to cool back down to a temperature below the melting temperature of the paraffin inhibitor component.

Use of the Aqueous Dispersion as a Pour Point Depressant

The aqueous dispersions of the invention can be used as pour point depressants, by adding the aqueous dispersion to the crude oil.

In this case, the compositions described above can be used as such. Alternatively, it is of course still possible to dilute the compositions of the invention before use, for example with water and/or with water-miscible solvents, for example methanol. The compositions can also be formulated together with other components.

The amount of the aqueous dispersion added to the crude oil is judged by the person skilled in the art such that the desired lowering of the pour point is achieved, it being obvious to the person skilled in the art that the amount necessary is dependent on the nature of the crude oil. On the other hand, it is desirable for economic reasons to use a minimum amount of pour point depressant.

The amount of aqueous dispersion is generally such that the amount of the polymeric paraffin inhibitor (X) is 50 to 1500 ppm based on the crude oil. The amount is preferably 100 to 1000 ppm, more preferably 250 to 600 ppm and, for example, 300 to 600 ppm.

It is advisable here to add the aqueous dispersions to the crude oil before the first paraffin crystals form. The temperature at which the very first paraffin crystals form is also called WAT ("wax appearance temperature"). In one embodiment of the invention, the aqueous dispersions are therefore added at a temperature above the WAT, preferably at at least 10° C. above the WAT.

The site of addition of the aqueous dispersion to the crude oil is suitably chosen by the person skilled in the art. The addition can be effected, for example, in the formation, in the well, at the wellhead or to a pipeline.

In one embodiment, the aqueous dispersion is injected into a crude oil pipeline. The injection can preferably be effected at the oilfield, i.e. at the start of the crude oil pipeline, but the injection can of course also be effected at another site. For example, the pipeline may be one leading onshore from an offshore platform. The aqueous dispersion can prevent blockage of pipelines if the crude oil cools down in the course of transport in the pipeline. This risk is naturally particularly pronounced when the pipeline is one in a cold environment, for example in an Arctic environment.

In a further embodiment of the invention, the aqueous dispersion is injected into a production well. In one embodiment, the production well may be an offshore production well. The injection can be effected, for instance, at the site where oil flows out of the formation into the production well. In this manner, the solidification of the crude oil in the production well and in downstream transport pipelines, an excessive increase in the viscosity thereof and the constriction of pipe cross sections by paraffin deposits can be prevented.

In one embodiment of the invention, the injection can be effected in an umbilical manner. This involves introducing a flexible string comprising at least one pipeline and optionally electrical wires or control wires in a protective shell axially into a well or a pipeline. The aqueous dispersion can be injected exactly at the desired site through the pipeline in the flexible string.

Further Uses of the Aqueous Composition

In a further embodiment of the invention, the above-described aqueous dispersions are used to prevent wax deposits on surfaces in contact with crude oil, mineral oil and/or mineral oil products. These are preferably surfaces in contact with crude oil.

Use is effected by adding said aqueous dispersion to the crude oil. The manner of use is analogous to the use as a pour point depressant. As well as the aqueous dispersions of the invention, it is of course possible to use further paraffin inhibitors.

ADVANTAGES OF THE INVENTION

The present invention relates to aqueous dispersions of paraffin inhibitor components which, even at high concentration of paraffin inhibitor components, are still fluid even at temperatures well below the freezing point.

These dispersions can easily be processed further without any need for complex operating steps (for example melting and dissolving of solid compounds). Working with combustible solvents is avoided.

The examples below are intended to illustrate the invention in detail.

Synthesis of the Paraffin Inhibitors
Preparation of Unmodified Olefin-MA Copolymers
Copolymer I
$C_{20/24}$ olefins+MA, 1:1 molar, no solvent For the polymerization, a four-neck flask with stirrer, internal thermometer, nitrogen inlet and reflux condenser and with feeds for maleic anhydride and initiator is used.

Melt 1 mol of maleic anhydride at 80° C. in a heatable dropping funnel. While sparging with $N_2$, heat an initial charge comprising 1 mol of a commercial mixture of α-olefins (main constituents: $C_{20}$, $C_{22}$ and $C_{24}$ olefins) to an internal temperature of 150° C., then meter in maleic anhydride and 1 mol % (based on monomers) of di-tert-butyl peroxide from separate feeds over the course of 5 h. Then polymerize further at an internal temperature of 150° C. for 1 h. An olefin-MA copolymer having a number-average molecular weight $M_n$ of 10 000 g/mol is obtained.

Copolymer II
$C_{20/24}$ olefins+MA, 1:1.14 molar, in aliphatic solvents

For the polymerization, a four-neck flask with stirrer, internal thermometer, nitrogen inlet and reflux condenser and with feeds for maleic anhydride and initiator is used.

Melt 1.1 mol of maleic anhydride at 80° C. in a heatable dropping funnel. While sparging with $N_2$, charge flask with Solvesso® 150. Heat 1 mol of a commercial mixture of α-olefins (main constituents: $C_{20}$, $C_{22}$ and $C_{24}$ olefins) to an internal temperature of 150° C., then meter in maleic anhydride and 1 mol % (based on monomers) of di-tert-butyl peroxide from separate feeds over the course of 5 h. The amount of the solvent is such as to give rise to a solution of 50% by weight of the polymer. After addition has ended, polymerize further at an internal temperature of 150° C. for 1 h. An olefin-MA copolymer having a number-average molecular weight $M_n$ of 4000 g/mol is obtained.

Paraffin Inhibitor I
Copolymer I, ring-opening with $C_{16/22}$ alcohols

For the synthesis, a four-neck flask with stirrer, internal thermometer, nitrogen inlet and reflux condenser and a feed for Solvesso® 150 (mixture of high-boiling aromatics, flashpoint 66° C.) is used.

15 g of copolymer I and 13.8 g of a commercially available mixture of linear alcohols (main constituents: $C_{16}$ to $C_{22}$ alcohols) are melted at an external temperature of 85° C. and, after the melting, 7.2 g of Solvesso® 150 are added. Heat to external temperature 150° C. and stir for 4 h.

What is obtained is a mixture of 80% by weight of copolymer and 20% by weight of Solvesso® 150 having a melting point of about 50° C.

Paraffin Inhibitor II
Copolymer I, Ring-Opening with $C_{22/26}$ Alcohols

For the synthesis, a four-neck flask with stirrer, internal thermometer, nitrogen inlet and reflux condenser and a feed for Solvesso® 150 (mixture of high-boiling aromatics, flashpoint 66° C.) is used.

15 g of copolymer I and 18.5 g of a commercially available mixture of linear alcohols (main constituents: $C_{22}$ to $C_{26}$ alcohols) are melted at an external temperature of 85° C. and, after the melting, 8.4 g of Solvesso® 150 are added. Heat to external temperature 150° C. and stir for 4 h.

What is obtained is a mixture of 80% by weight of copolymer and 20% by weight of Solvesso® 150 having a melting point of about 50° C.

Paraffin Inhibitor III
Copolymer II, Ring-Opening with $C_{16/22}$ Alcohols

For the synthesis, a four-neck flask with stirrer, internal thermometer, nitrogen inlet and reflux condenser and a feed for Solvesso® 150 (mixture of high-boiling aromatics, flashpoint 66° C.) is used.

19.7 g of a 50% solution of copolymer II in Solvesso® 150 and 10.4 g of a commercially available mixture of linear alcohols (main constituents: $C_{16}$ to $C_{22}$ alcohols) are melted at an external temperature of 85° C. Heat to external temperature 150° C. and stir for 6 h.

What is obtained is a mixture of 70% by weight of copolymer and 30% by weight of Solvesso® 150 having a melting point of about 45° C.

Paraffin Inhibitor IV

Copolymer II, Ring-Opening with $C_{22/26}$ Alcohols

For the synthesis, a four-neck flask with stirrer, internal thermometer, nitrogen inlet and reflux condenser and a feed for Solvesso® 150 (mixture of high-boiling aromatics, flashpoint 66° C.) is used.

15.0 g of a 50% solution of copolymer II in Solvesso® 150 and 9.5 g of a commercially available mixture of linear alcohols (main constituents: $C_{22}$ to $C_{26}$ alcohols) are melted at an external temperature of 85° C. Heat to external temperature 150° C. and stir for 6 h.

What is obtained is a mixture of 70% by weight of copolymer and 30% by weight of Solvesso® 150 having a melting point of about 45° C.

Surfactants

| Surfactant | | |
|---|---|---|
| no. | Type | Description |
| 1 | A | $C_{16/18}(EO)_{11}H$ linear $C_{16/18}$ alcohol, ethoxylated with 11 EO, HLB about 13 (Lutensol® AT 11) |
| 3 | B | i-$C_{13}(EO)_7H$ iso-$C_{13}$ oxo alcohol, ethoxylated with 7 EO, HLB about 12 (Lutensol® TO 7) |
| 4 | B | R-$CH_2N[(CH_2CH_2O)_6H]_2$ R = oleyl, HLB about 13 (Lutensol® FA 12) |
| 2 | C | $C_{16/18}(EO)_{50}H$ linear $C_{16/18}$ alcohol, ethoxylated with 50 EO, HLB about 18 (Lutensol® AT 50) |

Water-Miscible Organic Solvents
Ethylene Glycol
Propylene Glycol

II Procedure for the Experiments

Equipment

Stirrer system (Heidolph RZR 2102 control)
4-blade propeller stirrer (Ø 60 mm)
Ultra-Turrax (IKA T 18 digital)
Dispersing tool (IKA S18 N-19 G)
Balance (Mettler Toledo XP 10002 S)
Emulsifying pot (stainless steel, 1000 ml, H 185 mm, Ø85-95 mm)
Beaker (600 ml, tall form, with spout)
Long-stem thermometer (−20+250° C., immersion depth 100 mm)
Hotplate (Rommelsbacher AK 2080.2)
Kettle (Bosch WK 10)
pH meter (Knick 761 Calimatic)
Magnetic stirrer (Heidolph MR-Hei Tec)
Magnetic stirrer bar (L 40 mm, Ø7 mm)
Laboratory bottle (500 ml)

General Experimental Method

The paraffin inhibitor, the surfactants and a portion of the water and of the water-miscible organic solvent (see table for amounts) were weighed into the emulsifying pot and heated to 85° C. while stirring with a long-stem thermometer. Subsequently, stirring of the paraffin inhibitor mixture was continued with a propeller stirrer at 2000 rpm, keeping the temperature at 85° C. The remaining amount of water and of the water-miscible organic solvent and also KOH (see table for amounts) were preheated to 60° C. in a separate beaker. This solution was then added dropwise to the emulsion of the paraffin inhibitor while continuing to stir with the propeller stirrer within 5 min, and the mixture was stirred for a further 5 min. This was followed by homogenization with an Ultraturrax (25 000 rpm) preheated to 90° C. for 1 minute. Then the mixture was cooled to room temperature.

Homogenizer

A Bran+Luebbe SHL-05 homogenizer was used. This is a high-pressure homogenizing machine with a horizontal 3-piston pump.

Appearance of the Emulsions Obtained at 23° C.

The appearance of the aqueous emulsions at 23° C. was rated as follows in each case:

| Rating | Commentary |
|---|---|
| 1 | Homogeneous stable emulsion - no separation or creaming |
| 2 | Slight creaming, but sample homogeneous again after shaking |
| 3 | Distinct creaming of the sample. Sample not homogenized again by shaking |
| 4 | Sample shows small particles (specks). Sample not homogeneous |
| 5 | Unstable emulsion. Sample shows distinct separation |

Test of Flowability

To test the flowability, the upright vessel in which the aqueous composition is stored (35 mL glass bottles 30×80, glass thickness 1.2 mm, GL 22 thread) is tilted by 90°. The composition is free-flowing if it flows out of the vessel after the vessel has been tilted, and it is solid if it does not flow out of the vessel after the vessel has been tilted. Whether the composition flows readily or is viscous or highly viscous is observed visually.

Storage:

To test long-term stability at low temperatures, about 20 mL of the dispersion were introduced into the abovementioned bottles. The samples were stored at various temperatures (+5° C., −10° C. and −20° C.). After particular periods of time—as outlined above—it was checked whether the samples still flowed or not.

The results of the tests are shown in tables 1 to 7 below.

TABLE 1

Results of the comparative experiments with paraffin inhibitor I

| | | Paraffin inhibitor I | | | |
|---|---|---|---|---|---|
| | | C1 31.2 g | C2 31.2 g | C3 31.2 g | C4 31.2 g |
| $C_{16/18}(EO)_{11}H$ | (type A) | 7.0 g | 7.0 g | 7.0 g | 7.0 g |
| $C_{16/18}(EO)_{50}H$ | (type C) | — | — | 0.8 g | 0.8 g |
| Water | | 10.3 g | 10.3 g | 9.9 g | 9.9 g |
| 1,2-Propylene glycol (PG) | | 10.7 g | — | 10.7 g | — |
| Ethylene glycol (EG) | | — | 11.4 g | — | 11.4 g |
| 2nd addition | | 20.4 g $H_2O$, 0.4 g KOH, 21.2 g PG | 20.4 g $H_2O$, 0.4 g KOH, 22.6 g EG | 20.4 g $H_2O$, 0.4 g KOH, 21.2 g PG | 20.4 g $H_2O$, 0.4 g KOH, 22.6 g EG |

TABLE 1-continued

Results of the comparative experiments with paraffin inhibitor I

| | | Paraffin inhibitor I | | | |
|---|---|---|---|---|---|
| | | C1 31.2 g | C2 31.2 g | C3 31.2 g | C4 31.2 g |
| Appearance (@ 23° C.) | | 4 | 4 | 2 | 4 |
| pH (@ 23° C.) | | 7.5 | 7.6 | 7.5 | 7.6 |
| Storage (@ +5° C.) | 9 days | viscous | Viscous | viscous | viscous |
| Storage (@ −10° C.) | 1 day | highly viscous | Viscous | highly viscous | viscous |
| Storage (@ −10° C.) | 4 days | solid | Solid | solid | solid |
| Total amount of water | | 30.7 g | 30.7 g | 30.3 g | 33.3 g |
| Total amount of EG or PG | | 31.9 g | 34.0 g | 31.9 g | 34.0 g |

TABLE 2

Results of the comparative experiments with paraffin inhibitor I

| | | Paraffin inhibitor I | | | |
|---|---|---|---|---|---|
| | | C5 31.2 g | C6 31.2 g | C7 31.2 g | C8 31.2 g |
| $C_{16/18}(EO)_{11}H$ | (type A) | 3.5 g | 6.0 g | 10.5 g | 14.0 g |
| $C_{16/18}(EO)_{50}H$ | (type C) | 0.8 g | 0.8 g | 0.8 g | 0.8 g |
| Water | | 11.6 g | 10.4 g | 8.1 g | 3.2 g |
| 1,2-Propylene glycol | | 12.2 g | 10.8 g | 8.5 g | 3.3 g |
| 2nd addition | | 20.4 g $H_2O$, 0.4 g KOH, 21.4 g PG | 20.4 g $H_2O$, 0.4 g KOH, 22.6 g EG | 20.4 g $H_2O$, 0.4 g KOH, 21.2 g PG | 20.4 g $H_2O$, 0.4 g KOH, 22.6 g EG |
| Appearance (@ 23° C.) | | 3 | 1 | 1 | 1 |
| pH (@ 23° C.) | | 7.7 | 7.6 | 7.3 | 7.2 |
| Storage (@ +5° C.) | 30 days | fluid | Fluid | solid | solid |
| Storage (@ −10° C.) | 1 day | fluid | Fluid | — | — |
| Storage (@ −10° C.) | 21 days | highly viscous | solid (after 4 days) | — | — |
| Total amount of water | | 32 g | 30.8 g | 28.5 g | 23.6 g |
| Total amount of EG or PG | | 33.6 g | 33.4 g | 29.7 g | 25.9 g |

TABLE 3

Results of examples and comparative examples with paraffin inhibitor I

| | | Paraffin inhibitor I | | |
|---|---|---|---|---|
| | | C9 31.2 g | Example 1 31.2 g | Example 2 31.2 g |
| $C_{16/18}(EO)_{11}H$ | (type A) | 2.0 g | 2.0 g | 2.0 g |
| $i\text{-}C_{13}(EO)_7H$ | (type B) | — | 2.0 g | — |
| $R\text{-}CH_2N[(CH_2CH_2O)_{n/2}H]_2$ | (type B) | — | — | 2.0 g |
| $C_{16/18}(EO)_{50}H$ | (type C) | 0.8 g | 0.8 g | 0.8 g |
| Water | | 12.4 g | 11.4 g | 11.4 g |
| 1,2-Propylene glycol | | 12.9 g | 11.8 g | 11.8 g |
| 2nd addition | | 20.4 g $H_2O$, 0.4 g KOH, 21.2 g PG | 20.4 g $H_2O$, 0.4 g KOH, 21.2 g PG | 20.4 g $H_2O$, 0.4 g KOH, 21.2 g PG |
| Appearance (@ 23° C.) | | 3 | 2 | 2 |
| pH (@ 23° C.) | | 7.9 | 7.6 | 7.9 |
| Storage (@ −10° C.) | 1 day | — | fluid | fluid |
| Storage (@ −10° C.) | 30 days | — | fluid | viscous |
| Storage (@ −20° C.) | 19 days | — | highly viscous | — |

TABLE 4

Comparison of homogenization using an Ultraturrax and a homogenizer

| | Example 3 | Example 4 |
|---|---|---|
| Experimental procedure | Example 1 was repeated 9x on the 500 mL scale. The individual batches were mixed and the following properties were determined therefrom: | 2000 mL of the product from example 3 were heated to 55° C., and the dispersion was allowed to run 2x through a commercial homogenizer (SHL-05, from Bran + Luebbe) at 250 bar. Subsequently, the following properties were determined therefrom: |
| Appearance (@ 23° C.) | 2 | 2 |
| pH (@ 23° C.) | 7.5 | 7.4 |
| Storage 30 days (@ −20° C.) | highly viscous | viscous |

TABLE 5

Result with paraffin inhibitor II

| | | Paraffin inhibitor II Example 5 31.3 |
|---|---|---|
| $C_{16/18}(EO)_{11}H$ | (type A) | 2.0 g |
| i-$C_{13}(EO)_7H$ | (type B) | 2.0 g |
| $C_{16/18}(EO)_{50}H$ | (type C) | 0.8 g |
| Demin. water | | 11.8 g |
| 1,2-Propylene glycol | | 12.3 g |
| 2nd addition | | 20.4 g $H_2O$, 0.4 g KOH, 21.2 g PG |
| Appearance (@ 23° C.) | | 2 |
| pH (@ 23° C.) | | 7.9 |
| Storage (@ −10° C.) | 1 day | fluid |
| Storage (@ −10° C.) | 30 days | viscous |
| Storage (@ −20° C.) | 9 days | highly viscous |

TABLE 6

Results of the comparative examples and examples with paraffin inhibitor III

| | | Paraffin inhibitor III | |
|---|---|---|---|
| | | C10 36.2 g | Example 6 36.2 g |
| $C_{16/18}(EO)_{11}H$ | (type A) | 3.5 g | 2.0 g |
| i-$C_{13}(EO)_7H$ | (type B) | — | 2.0 g |
| $C_{16/18}(EO)_{50}H$ | (type C) | 1.5 g | 0.8 g |
| Demin. water | | 10.2 g | 10.3 g |
| 1,2-propylene glycol | | 10.6 g | 10.7 g |
| 2nd addition | | 20.4 g $H_2O$, 0.4 g KOH, 21.2 g PG | 20.4 g $H_2O$, 0.4 g KOH, 21.2 g PG |
| Appearance (@ 23° C.) | immediate | 1 | 1 |
| pH (@ 23° C.) | | 7.0 | 7.0 |
| Storage (@ −10° C.) | 30 days | highly viscous | fluid |
| Storage (@ −20° C.) | 19 days | Solid | highly viscous |
| Comments | | only two surfactants | |

TABLE 7

Result with paraffin inhibitor IV

| | | Paraffin inhibitor IV Example 7 34.9 g |
|---|---|---|
| $C_{16/18}(EO)_{11}H$ | (type A) | 2.0 g |
| i-$C_{13}(EO)_7H$ | (type B) | 2.0 g |
| $C_{16/18}(EO)_{50}H$ | (type C) | 0.8 g |
| Demin. water | | 9.5 g |
| 1,2-Propylene glycol | | 10.0 g |
| 2nd addition | | 20.4 g $H_2O$, 0.4 g KOH, 21.2 g PG |
| Appearance (@ 23° C.) | | 1 |
| pH (@ 23° C.) | | 7.2 |
| Storage (@ 23° C.) | 30 days | Stable |
| Storage (@ −20° C.) | 30 days | Viscous |

Comments on the Experiments:

In all experiments and comparative experiments, the concentration of the pour point depressant was about 25% by weight based on the sum total of all components of the dispersion, i.e. a concentration of practical relevance.

Comparative experiments C1 and C2 were conducted only using a surfactant A ($C_{16/18}(EO)_{11}H$) in an amount of about 7% by weight based on the sum total of all components of the dispersion. The dispersions are fluid at room temperature, but the quality is still not very good (speckly). When stored at −10° C., the dispersions are solid after 4 days.

In the case of comparative experiments C3 and C4, in addition to the surfactant A ($C_{16/18}(EO)_{11}H$), a small amount of a type C surfactant ($C_{16/18}(EO)_{50}H$) was also added. This distinctly improves the quality of the dispersion at room temperature, but cannot prevent the dispersion from solidifying in the course of storage at −10° C.

In comparative experiments C5 to C9, the amount of surfactant A was varied. In the case of a small amount (about 3.5% by weight based on the sum total of all components), the dispersion is still fluid (highly viscous) even after 21 days when stored at −10° C., but the quality of the dispersion is poor even at room temperature; commencement of phase separation (creaming) is observed.

With only 2% by weight of surfactant A (C9), the dispersion separates again even at room temperature. With increasing amount of surfactant A, the quality of the dispersion at room temperature increases, but it also becomes increasingly solid, and in the case of high surfactant concentrations does so even when stored at +5° C.

In examples 1 and 2, a portion of surfactant A was replaced by surfactant B. Surfactant C is present as before.

The combination of the 3 surfactants gives a dispersion which both has good quality and remains fluid when stored at −10° C.; the dispersion of example 1 still remains fluid even when stored at −20° C.

Examples 3 and 4 (table 4) show the effect when the dispersion is additionally homogenized. This affords a dispersion having distinctly improved quality.

Tables 5 to 7 show that stable emulsions which remain fluid when stored at low temperatures can also be achieved with other paraffin inhibitors.

The invention claimed is:

1. An aqueous composition comprising at least
   (1) a continuous aqueous phase comprising water and a water-miscible organic solvent,
   (2) particles of a paraffin inhibitor component having a melting point of 30° C. to 95° C. that are distributed therein, and
   (3) surfactants,
   wherein
      the aqueous phase has a melting point of not more than −20° C.,
      the paraffin inhibitor component is a mixture comprising at least
         an organic, water-immiscible solvent, and
         a polymeric, water-insoluble paraffin inhibitor (X) comprising, as monomers,
            α-olefins having 14 to 32 carbon atoms, and
            monoethylenically unsaturated monomers comprising carboxylate groups, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms,
      the amount of the paraffin inhibitor component is 20% to 40% by weight, based on the sum total of all the components of the composition,
      the surfactants are at least three different surfactants (A), (B) and (C) which are defined as follows:
   (A) at least one nonionic surfactant of the general formula $R^1$-$(AO)_x$H where
      $R^1$ is a linear alkyl radical having 8 to 20 carbon atoms,
      AO are independently $C_2$- to $C_4$-alkylene oxide units, with the proviso that at least 80 mol % of the AO units are ethylene oxide units (EO), and
      x is a number from 5 to 20,
   (B) at least one surfactant selected from the group of
      (B1) nonionic surfactants of the general formula $R^2$-$(AO)_y$H where
         $R^1$ is a branched alkyl radical having 8 to 20 carbon atoms,
         AO are independently $C_2$- to $C_4$-alkylene oxide units, with the proviso that at least 80 mol % of the AO units are ethylene oxide units (EO), and
         y is a number from 5 to 20,
      (B2) nonionic surfactants of the general formula $R^3$—$CH_2$—$N[(AO)_zH]_2$ where
         $R^3$ is a linear alkyl radical or alkenyl radical having 8 to 20 carbon atoms,
         AO are independently $C_2$- to $C_4$-alkylene oxide units, with the proviso that at least 80 mol % of the AO units are ethylene oxide units (EO), and
         z is a number from 3 to 10,
   (C) at least one nonionic surfactant of the general formula $R^4$-$(AO)_m$H where
      $R^4$ is a linear alkyl radical having 8 to 20 carbon atoms,
      AO are independently $C_2$- to $C_4$-alkylene oxide units, with the proviso that at least 80 mol % of the AO units are ethylene oxide units (EO), and
      m is a number from more than 20 to 70,
   and where the amount of the surfactants (A) is 5% to 15% by weight, that of the surfactants (B) from 5% to 15% by weight, and that of the surfactants (C) from 2% to 5% by weight, based in each case on the paraffin inhibitor component.

2. The aqueous composition according to claim 1, wherein the surfactants (A), (B), (C) are defined as follows:
   (A) at least one nonionic surfactant of the general formula $R^1$-$(EO)_x$H where
      $R^1$ is a linear alkyl radical having 12 to 20 carbon atoms, and
      EO is ethylene oxide units, and
      x is a number from 8 to 15,
   (B) at least one surfactant selected from the group of
      (B1) nonionic surfactants of the general formula $R^2$-$(EO)_y$H where
         $R^1$ is a branched alkyl radical having 11 to 17 carbon atoms, and
         EO is ethylene oxide units, and
         y is a number from 5 to 15,
      (B2) nonionic surfactants of the general formula $R^3$—$CH_2$—$N[(EO)_zH]_2$ where
         $R^3$ is a linear alkenyl radical having 12 to 20 carbon atoms, and
         EO is ethylene oxide units, and
         z is a number from 4 to 8,
   (C) at least one nonionic surfactant of the general formula $R^4$-$(EO)_m$H where
      $R^4$ is a linear alkyl radical having 12 to 20 carbon atoms, and
      EO is ethylene oxide units, and
      m is a number from 40 to 60.

3. The aqueous composition according to claim 1, wherein the total amount of the surfactants is 15% to 25% by weight.

4. The aqueous composition according to claim 1, wherein the paraffin inhibitor component has a melting point of 40 to 70° C.

5. The aqueous composition according to claim 1, wherein the paraffin inhibitor component has a particle size of 1 μm to 10 μm.

6. The aqueous composition according to claim 1, wherein the water-miscible organic solvent is at least one selected from the group of methanol, ethanol, n-propanol, i-propanol, ethylene glycol, diethylene glycol, 1,2-propylene glycol, 1,3-propylene glycol, ethylene glycol monomethyl ether or propylene glycol monomethyl ether.

7. The aqueous composition according claim 1, wherein the water-miscible organic solvent is at least one selected from the group of ethylene glycol, diethylene glycol, 1,2-propylene glycol, 1,3-propylene glycol, ethylene glycol monomethyl ether or propylene glycol monomethyl ether.

8. The aqueous composition according to claim 1, wherein the amount of the water-miscible organic solvent is 30% to 70% by weight, based on the amount of all components of the aqueous phase.

9. The aqueous composition according to claim 1, wherein the aqueous phase comprises water and 1,2-propylene glycol and/or ethylene glycol, where the proportion of 1,2-propylene glycol and/or ethylene glycol is 40% to 60% by weight, and the remainder of the aqueous phase is water.

10. The aqueous composition according to claim 1, wherein the paraffin inhibitor component comprises 60% by weight to 90% by weight of polymeric paraffin inhibitors (X) and 10% by weight to 40% by weight of organic, water-immiscible solvents, where the weight figures are based on the sum total of all components of the paraffin inhibitor component.

11. The aqueous composition according to claim 1, wherein the organic, water-immiscible solvent comprises hydrocarbons or hydrocarbon mixtures.

12. The aqueous composition according to claim 1, wherein the polymeric paraffin inhibitor (X) is a copolymer comprising, as monomers,
   40 to 60 mol % of α-olefins having 14 to 32 carbon atoms, and
   60 to 40 mol % of maleic acid, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms, and where the degree of esterification is 30% to 60% based on the number of all carboxylate groups present.

13. An aqueous composition comprising at least
   (1) a continuous aqueous phase,
   (2) particles of a paraffin inhibitor component that are distributed therein, and
   (3) surfactants,
   wherein
      the continuous aqueous phase comprises water and 1,2-propylene glycol and/or ethylene glycol, where the proportion of 1,2-propylene glycol and/or ethylene glycol is 40% to 60% by weight based on the sum total of all components of the aqueous phase, and the rest is water,
      the paraffin inhibitor component is a mixture comprising at least
         10% to 40% by weight of a hydrocarbon or a hydrocarbon mixture having a boiling point of at least 120° C., and
         60% to 90% by weight of at least one polymeric, water-insoluble paraffin inhibitor (X) comprising, as monomers,
            α-olefins having 14 to 32 carbon atoms, and
            monoethylenically unsaturated monomers comprising carboxylate groups, where some or all of the carboxylate groups have been esterified with aliphatic, cycloaliphatic and/or aromatic alcohols, with the proviso that at least 50 mol % of the alcohols are linear aliphatic alcohols having 16 to 32 carbon atoms,
         where the weight percentages are based on the sum total of all components of the paraffin inhibitor component and the sum total of paraffin inhibitors (X) and hydrocarbons is 100% by weight,
      the amount of the paraffin inhibitor component is 20% to 40% by weight, based on the sum total of all the components of the aqueous composition,
      the surfactants are at least three different surfactants (A), (B) and (C) which are defined as follows:
   (A) at least one nonionic surfactant of the general formula $R^1$-(AO)$_x$H where
      $R^1$ is a linear alkyl radical having 8 to 20 carbon atoms,
      AO are independently $C_2$- to $C_4$-alkylene oxide units, with the proviso that at least 80 mol % of the AO units are ethylene oxide units (EO), and
      x is a number from 5 to 20,
   (B) at least one surfactant selected from the group of
      (B1) nonionic surfactants of the general formula $R^2$-(AO)$_y$H where
         $R^1$ is a branched alkyl radical having 8 to 20 carbon atoms,
         AO are independently $C_2$- to $C_4$-alkylene oxide units, with the proviso that at least 80 mol % of the AO units are ethylene oxide units (EO), and
         y is a number from 5 to 20,
      (B2) nonionic surfactants of the general formula $R^3$—CH$_2$—N[(AO)$_z$H]$_2$ where
         $R^3$ is a linear alkyl radical or alkenyl radical having 8 to 20 carbon atoms,
         AO are independently $C_2$- to $C_4$-alkylene oxide units, with the proviso that at least 80 mol % of the AO units are ethylene oxide units (EO), and
         z is a number from 3 to 10,
   (C) at least one nonionic surfactant of the general formula $R^4$-(AO)$_m$H where
      $R^4$ is a linear alkyl radical having 8 to 20 carbon atoms,
      AO are independently $C_2$- to $C_4$-alkylene oxide units, with the proviso that at least 80 mol % of the AO units are ethylene oxide units (EO), and
      m is a number from more than 20 to 70,
   and where the amount of the surfactants (A) is 5% to 15% by weight, that of the surfactants (B) from 5% to 15% by weight, and that of the surfactants (C) from 2% to 5% by weight, based in each case on the paraffin inhibitor component.

14. A process for producing an aqueous composition according to claim 1, which comprises melting the paraffin inhibitor component(s), distributing them in the aqueous phase, with addition of the surfactants (A), (B) and (C), at a temperature above the melting temperature of the paraffin inhibitor component, and then allowing the mixture to cool down to a temperature below the melting temperature of the paraffin inhibitor component.

15. The process for producing an aqueous composition according to claim 14, wherein distribution of the molten paraffin inhibitor component is accomplished using stirring or dispersing units selected from the group of stirrers, propeller stirrers, colloid mills, Ultraturrax systems, ultrasound generators, homogenizers or combinations thereof.

16. The process according to claim 14, wherein the production is effected by
   in a first stage mixing a solid paraffin inhibitor component, surfactants (A), (B) and (C) and at least a portion of the aqueous phase with one another at a temperature below the melting temperature of the paraffin inhibitor component, and then heating them to a temperature above the melting temperature with continued mixing,
   in a second stage homogenizing the mixture using a suitable dispersing unit, and
   then allowing the mixture to cool down to a temperature below the melting temperature of the paraffin inhibitor component.

17. The process according to claim 16, wherein the mixing in the first stage is effected by means of stirring.

18. The process according to claim 16, wherein the dispersing unit used in the second stage is a homogenizer.

19. A method of using the aqueous composition according to claim 1 as pour point depressants for crude oil, comprising adding the aqueous composition to the crude oil.

20. The method according to claim 19, wherein the aqueous composition is used in such an amount that the amount of the paraffin inhibitors (X) added is 50 to 1500 ppm based on the crude oil.

21. The method according to claim 19, wherein the aqueous composition is injected into a crude oil pipeline.

22. The method according to claim 19, wherein the aqueous composition is injected into a production well.

23. The method according to claim 21, wherein the injection is effected offshore.

24. The method according to claim 21, wherein the injection is undertaken in an umbilical manner.

25. A method of using the aqueous composition according to claim 1 for prevention of wax deposits on surfaces that are in contact with crude oil, comprising adding the aqueous composition to the crude oil.

* * * * *